(12) United States Patent
Koppinen et al.

(10) Patent No.: US 12,209,942 B2
(45) Date of Patent: Jan. 28, 2025

(54) PARTICLE SENSOR

(71) Applicant: Teknologian tutkimuskeskus VTT Oy, Espoo (FI)

(72) Inventors: Panu Koppinen, Espoo (FI); Teuvo Sillanpää, Espoo (FI); Markku Ylilammi, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 718 days.

(21) Appl. No.: 17/055,146

(22) PCT Filed: May 22, 2019

(86) PCT No.: PCT/FI2019/050397
§ 371 (c)(1),
(2) Date: Nov. 13, 2020

(87) PCT Pub. No.: WO2019/224430
PCT Pub. Date: Nov. 28, 2019

(65) Prior Publication Data
US 2021/0148803 A1    May 20, 2021

(30) Foreign Application Priority Data
May 23, 2018   (FI) ..................................... 20185474

(51) Int. Cl.
*G01N 15/06* (2024.01)
*G01N 15/02* (2006.01)
*G01N 15/00* (2006.01)

(52) U.S. Cl.
CPC ..... *G01N 15/0656* (2013.01); *G01N 15/0266* (2013.01); *G01N 2015/0046* (2013.01)

(58) Field of Classification Search
CPC ........... G01N 15/0656; G01N 15/0266; G01N 2015/0046; G01N 2015/0038; G01N 15/1031; G01N 15/1056
See application file for complete search history.

(56) References Cited

U.S. PATENT DOCUMENTS

2004/0227493 A1*  11/2004  Van Brocklin ...... G09G 3/3466
                                                               320/166
2010/0089131 A1    4/2010  Niksa et al.
2012/0032692 A1    2/2012  Kothari et al.
(Continued)

FOREIGN PATENT DOCUMENTS

CN       200941093 Y       8/2007
CN       102918381 A       2/2013
(Continued)

OTHER PUBLICATIONS

English Machine Translation of Chen et al. (CN 102536406 B), Feb. 12, 2014, translated online Apr. 2024 (Year: 2014).*
(Continued)

*Primary Examiner* — David Z Huang
(74) *Attorney, Agent, or Firm* — Laine IP Oy

(57) ABSTRACT

According to an example aspect of the present invention, there is provided an apparatus comprising a microelectromechanical, MEMS, capacitor comprising two plates and a gap between the plates, a gas conveyor configured to cause gas to flow through the gap, and readout circuitry configured to measure a capacitance of the MEMS capacitor.

14 Claims, 6 Drawing Sheets

(56) References Cited

U.S. PATENT DOCUMENTS

| | | | | |
|---|---|---|---|---|
| 2013/0036793 | A1* | 2/2013 | White | G01N 15/0255 |
| | | | | 73/24.02 |
| 2016/0370276 | A1* | 12/2016 | Yang | G01N 15/0606 |
| 2017/0217765 | A1 | 8/2017 | Rajaraman et al. | |
| 2017/0299488 | A1 | 10/2017 | Kim et al. | |
| 2017/0299489 | A1* | 10/2017 | Ho | G01N 27/22 |

FOREIGN PATENT DOCUMENTS

| | | | |
|---|---|---|---|
| CN | 102536406 B * | 2/2014 | |
| DE | 102014016413 A1 | 5/2016 | |
| DE | 102016221369 A1 | 5/2018 | |
| JP | 2003510034 A | 3/2003 | |
| JP | 2012047597 A | 3/2012 | |
| JP | 201354164 A | 3/2013 | |
| JP | 2013541648 A | 11/2013 | |
| JP | 20146103 A | 1/2014 | |
| JP | 2015141074 A | 8/2015 | |
| JP | 2018004345 A | 1/2018 | |
| WO | WO2011132164 A1 | 10/2011 | |
| WO | WO2012165939 A1 | 12/2012 | |
| WO | WO2015189089 A1 | 12/2015 | |
| WO | WO2017222876 A1 | 12/2017 | |

OTHER PUBLICATIONS

Jimbo et al: Study of micro-sensor for detecting PM2.5. Materials of the Institute of Electrical Engineers of Japan, Chemical Sensor Study Group, Jun. 29, 2016, pp. 31-35.

Paprotny et al: Microfabricated air-microfluidic sensor for personal monitoring of airborne particulate matter: Design, fabrication, and experimental results. Sensors and Actuators A: Physical, Jan. 18, 2013, vol. 201, pp. 506-516.

* cited by examiner

PARTICLE SENSOR

FIELD

The present invention relates to capacitance-based particle detection.

BACKGROUND

Poor air quality due to chemical and particulate pollutants is a health hazard in urban areas. According to the World Health Organization, WHO, exposure to air pollutants has contributed to seven million deaths in 2012, that being one in eight of total global deaths. In addition to the effect of air pollutants on respiratory systems of humans, strong links between exposure to air pollution and, among many other medical conditions, cardiovascular diseases and cancer have been established.

Negative health effects from airborne pollutants are manifold and depend on their composition and state, for example, gaseous or solid state. Monitoring of various air pollutants, their concentrations and space-time distribution is, therefore, important not only on the global scale, but on a more localized basis within regions and localities for localization of pollution sources and a geographical extent of the pollution. In order to measure transport of pollutants and to forecast evolution of pollution spread, the measurements may be conducted frequently and preferably over a dense spatial grid.

Filter-based monitoring of air pollutants comprises using filters with selectivity for particulate sizes of interest. Once the filters have been exposed to air traversing them, they may be assessed for particulate matter caught therein, to estimate concentrations of particles in the air, or, more generally, a gas.

Particulate pollutants come in a range of sizes. Smog particles may range from 0.01 to 1 micrometre, fly ash particles from 1 to 100 micrometres, pollen particles from 10 to 100 micrometres, heavy dust from 100 to 1000 micrometres and cat allergens from 0.01 to 3 micrometres, for example. Consequently, using filters, a bank of filters of differing selectivity may be used to obtain an estimate of a distribution of particle sizes of particles in the gas, such as air. The distribution of particle sizes may comprise plural estimates of particle concentrations of specific particle size, in the gas.

SUMMARY OF THE INVENTION

According to some aspects, there is provided the subject-matter of the independent claims. Some embodiments are defined in the dependent claims.

According to a first aspect of the present invention, there is provided an apparatus comprising a microelectromechanical, MEMS, capacitor comprising two plates and a gap between the plates, a gas conveyor configured to cause gas to flow through the gap, and readout circuitry configured to measure a capacitance of the MEMS capacitor.

Various embodiments of the first aspect may comprise at least one feature from the following bulleted list:
- the gas conveyor comprises at least one of a mechanism to create a pressure difference over the gap and a thermophoretic device configured to create a temperature gradient over the gap
- the readout circuitry is configured to detect a change in the capacitance of the MEMS capacitor caused by a particle flowing through the gap with the gas
- the MEMS capacitor comprises a plurality of gaps connected in parallel, each gap having its own readout electronics
- a width of the gap is adjustable
- the width of the gap is adjustable by applying a voltage over the plates, such that an electrostatic force is caused to move at least one of the plates
- the gap has a width of between 0.05 and 2.00 micrometres.

According to a second aspect of the present invention, there is provided an apparatus comprising at least one processing core, at least one memory including computer program code, the at least one memory and the computer program code being configured to, with the at least one processing core, cause the apparatus at least to direct a gas conveyor configured to cause gas to flow through an gap between plates of a microelectromechanical, MEMS, capacitor to convey the gas through the gap, receive inputs from readout circuitry configured to measure a capacitance of the MEMS capacitor, and to derive, from the inputs, a particle concentration in the gas.

Various embodiments of the second aspect may comprise at least one feature from the following bulleted list:
- the gas conveyor comprises at least one of a mechanism to create a pressure difference over the gap and a thermophoretic device configured to create a temperature gradient over the gap
- the apparatus is further configured to cause a width of the gap to be adjusted
- the apparatus is configured to cause the width of the gap to be adjusted by causing an adjustable voltage to be applied to the plates
- the apparatus is configured to obtain, using plural gap widths in sequence, a distribution of particle sizes of particles in the gas.

According to a third aspect of the present invention, there is provided a method, comprising directing a gas conveyor to cause gas to flow through an gap between plates of a microelectromechanical, MEMS capacitor, receiving inputs from readout circuitry configured to measure a capacitance of the MEMS capacitor, and deriving, from the inputs, a particle concentration in the gas.

Various embodiments of the third aspect may comprise at least one feature corresponding to a feature from the preceding bulleted list laid out in connection with the second aspect.

According to a fourth aspect of the present invention, there is provided an apparatus comprising means for directing a gas conveyor configured to cause gas to flow through an gap between plates of a microelectromechanical, MEMS, capacitor to convey the gas through the gap, means for receiving inputs from readout circuitry configured to measure a capacitance of the MEMS capacitor, and means for deriving, from the inputs, a particle concentration in the gas.

According to a fifth aspect of the present invention, there is provided a non-transitory computer readable medium having stored thereon a set of computer readable instructions that, when executed by at least one processor, cause an apparatus to at least direct a gas conveyor configured to cause gas to flow through an gap between plates of a microelectromechanical, MEMS, capacitor to convey the gas through the gap, receive inputs from readout circuitry configured to measure a capacitance of the MEMS capacitor, and derive, from the inputs, a particle concentration in the gas.

According to a sixth aspect of the present invention, there is provided a computer program configured to cause a method in accordance with the third aspect to be performed.

EMBODIMENTS

A microelectromechanical, MEMS, capacitor may be employed to detect particles in a gas which flows between the plates of the capacitor. A particle flowing through a gap between the plates of the capacitor causes a transient change in capacitance of the capacitor, which may be detected with suitable readout circuitry.

A thickness of the gap in the MEMS capacitor may be adjustable, to thereby obtain selectivity as to the particle size that may pass through the gap. In detail, particles with a diameter larger than the gap width cannot fit through. By modifying the thickness of the gap, a distribution of particle sizes may be determined.

Figure 1:
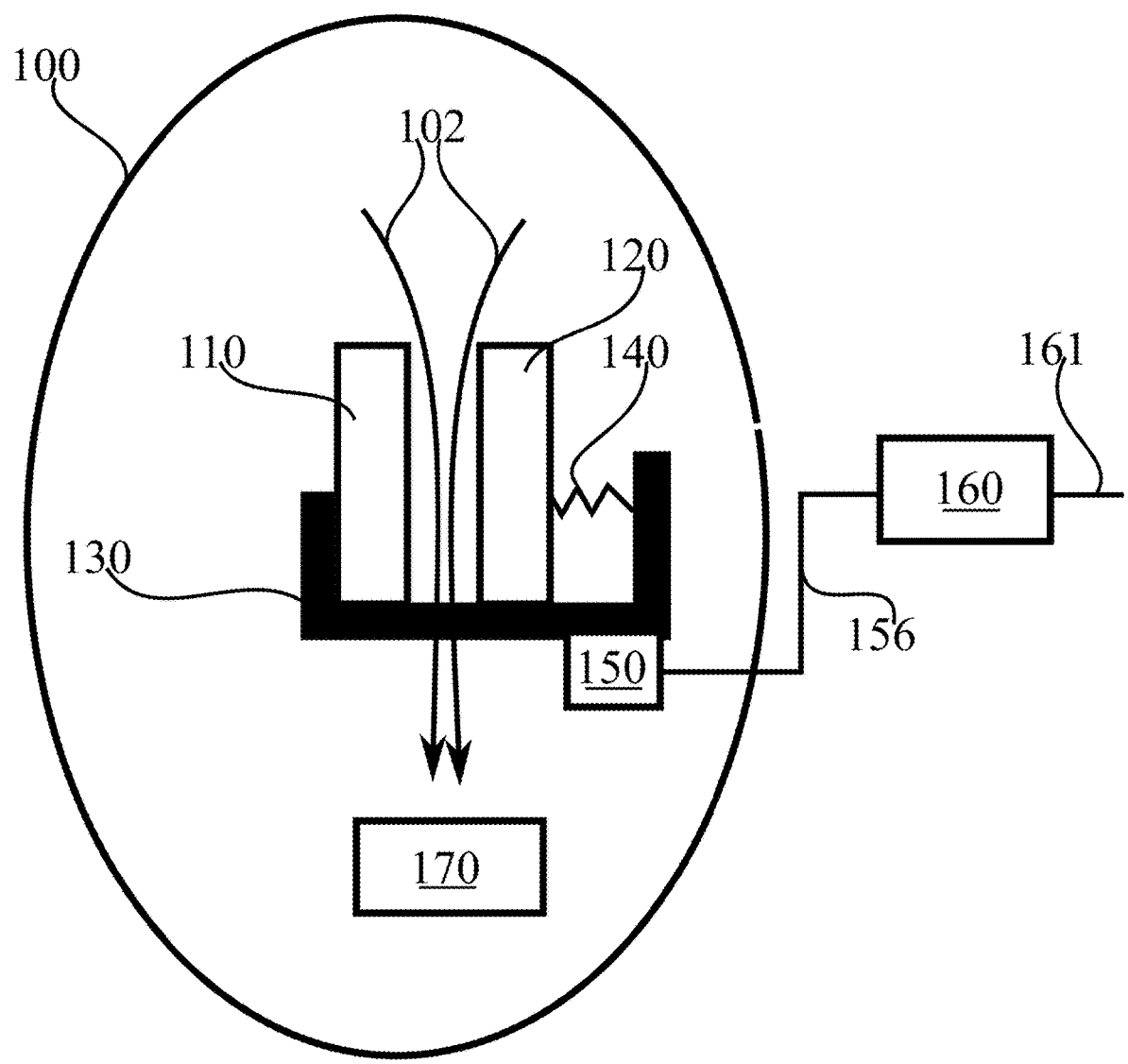
FIG. 1 illustrates an example system in accordance with at least some embodiments of the present invention.

FIG. 1 illustrates an example system in accordance with at least some embodiments of the present invention. A MEMS capacitor 100 comprises two plates 110, 120, which may be made of, or coated with, a metallic substance, for example. The plates 110, 120 need not be of the simple shape which is illustrated in FIG. 1 for the sake of simplicity and clarity of the figure. MEMS capacitor 100 has a housing 130 onto which other elements of the MEMS capacitor 100 are mounted. Plate 120 is mounted on housing 130 using a spring mounting 140, such that the distance between plates 110 and 120 is adjustable, for example by applying a selectable bias voltage to the plates 110 and 120 to thereby generate an electrostatic attractive force of selectable strength. The spring mounting 140 is illustrated in FIG. 1 in a schematic manner, and many mechanical variations of the spring mechanism may be employed, or, additionally or alternatively, other ways to enable adjusting the distance between plates 110 and 120. The distance between the plates 110 and 120 defines a width of the gap.

While discussed herein primarily in terms of one gap and two plates, in general the MEMS capacitor 100 may comprise a plurality of gaps connected in parallel, each gap having its own readout electronics, each gap being between two plates. As such, in this general form the number of plates may be more than two.

Readout circuitry 150 is configured to measure a capacitance of MEMS capacitor 100. Readout circuitry 150 is enabled to detect relatively quick changes in the capacitance, as will be described herein below. Readout circuitry 150 is operatively coupled, via connection 156, with a control device 160. In some embodiments, connection 156 traverses housing 130. Readout circuitry 160 may be configured to measure the capacitance of MEMS capacitor 100 by determining its response to a square wave, or by a resonance measurement, for example, as is known in the art.

Control device 160 may be configured to record capacitance measurement signals from readout circuitry 150. Control device 160 may further be configured to cause the gap width between the plates to change, for example by causing a bias voltage to change. Control device 160 may be configured to perform a series of measurements using MEMS capacitor 100, the series of measurements comprising a plurality of measurements with different gap widths. Connection 161 may connect control device 160 to further nodes, for example via the Internet, the Internet of Things or a sensor network. Connection 161 may be wire-line or at least in part wireless.

Gas conveyor 170 is configured to cause gas, such as air, to flow between plates 110, 120 through the gap. For example, gas conveyor may be arranged to generate a pressure gradient across the length of the gap. A pressure gradient may be generated by at least one fan installed to create under-pressure between gas conveyor 170 and the gap, as illustrated in FIG. 1, and/or to create over-pressure between gas conveyor 170 and the gap.

Another possibility is to use a thermophoretic force, also known as thermodiffusion, whereby a temperature gradient is caused across the length of the gap, such that the gas is caused to flow through the gap. While the width of the gap is the distance between plates 110 and 120, the length of the gap is perpendicular to this, such that as the gas flows along the length of the gap, the gas flows from one side of the MEMS capacitor 100 to another side, through the gap separating plates 110, 120. A temperature gradient may be caused across the length of the gap by using a heatable grid or plate, for example.

Existing fine particle detection schemes are typically bulky, that is, not portable, and expensive, their prices ranging in the tens of thousands of euros, while on-chip solutions would have several advantages over existing solutions, such as their small size, low cost and low power consumption. A miniaturized particle sensor platform is a key enabler for sensor networks for air quality monitoring that can be formed either by embedding sensors in basic infrastructure or even in mobile devices. Air quality data together with pressure information may be collected and reported to a cloud service, for example, and utilized for air quality forecasting and/or monitoring. Forecasting may further enable an early warning system for air pollution levels. Also, a mobile fine particle sensor could work as a personal dosimeter to measure accumulated exposure to fine particle hazards. Such a sensor network cold have a significant societal and economic impact, due to reduction in mortality rates and healthcare costs. For example, a user might react to an alarm concerning particulate pollution by donning a protective mask.

In use, gas conveyor 170 pushes or pulls gas 102, such as air, through the gap between plates 110 and 120, while readout circuitry 150 measures the capacitance of MEMS capacitor 100. In case a particle is conveyed through the gap, the capacitance of the MEMS capacitor 100 changes, in other words, the capacitance of the MEMS capacitor 100 is different depending on whether there is only gas, or gas and a particle, in the gap. A transient change in the capacitance may be counted as a particle that has flown through the gap. In practice, the capacitance will transiently increase when a particle is between the plates, since relative permittivity of a particle is, in general, greater than that of air.

Readout circuitry 150 or control device 160 may be configured to assign an estimated size to the particle passing through the gap, based on a size of the transient effect on the capacitance. The width of the gap defines an upper limit for a diameter of a particle passing through. A mapping may be prepared from the size of the transient change in capacitance to an estimate of particle size. The mapping may be prepared, before measurements are conducted, experimentally or from first principles. Since the gap in a practical MEMS capacitor 100 may be relatively narrow, of the order of 0.1 to a few micrometres, it may be relatively unlikely that two particles would be in the gap simultaneously, which enables more reliable counting of individual particles.

During measurement, control device 160 may compile statistics of the number and size of particles passing through the gap. As described above, the size of each particle may be estimated based on the gap width and the size of the change in capacitance.

Control device 160 may be arranged to conduct a series of measurements with different gap widths, for example starting from a narrow gap and progressing to wider gap widths. Alternatively, a measurement series may start with a wider gap and proceed to a narrower gap width. Since the gap width acts as a natural cut-off for particle diameter, this manner of measurement may be useful in deriving a particle size distribution of particles present in the gas, which may be air, for example.

To conduct the series of measurements, control device 160 may direct the gap between plates 110 and 120 to first assume an initial value, and then gather measurement results sufficient to characterize the concentration in the gas of particles capable of fitting through the gap when the gap is at the initial value width. Control device 160 may then cause the gap to assume a second width, for example wider than the initial value, and to gather measurement results sufficient to characterize the concentration in the gas of particles capable of fitting through the gap when the gap is in the second width.

When increasing the gap width, it may be possible to identify transient changes in capacitance caused by particles too large to have been present in an earlier measurement, performed when the gap was narrower. This is so, since the change in capacitance is the larger the larger is the particle. Thus particles already accounted for in measurements using narrower gap widths may be eliminated from statistics when using a wider gap width, which may assist in deriving a size distribution for the particles.

Control device 160 may be configured to dynamically determine, when to conclude a measurement using a specific gap width. For example, once a preconfigured number of particles have been detected passing through the gap, control device 160 may decide that enough data has been collected to characterize particles using a specific gap width. The gap width may then be changed, or, if the measurement series only has one measurement with one gap width, the measurement series may be concluded. For example, 40 or 80 particles may be sufficient. Alternatively or in addition, a measurement may be concluded after a pre-configured time has elapsed during which the measurement has been active. For example, in case no particles, or very few particles, are present in the gas, detecting the preconfigured number of particles may be difficult or even impossible.

To determine a concentration of particles, control device 160 may have an estimate of how much gas passes through the gap. This may be known beforehand, using a table of gas flow rates, using gas conveyor 170, as a function of the gap width.

Figure 2:
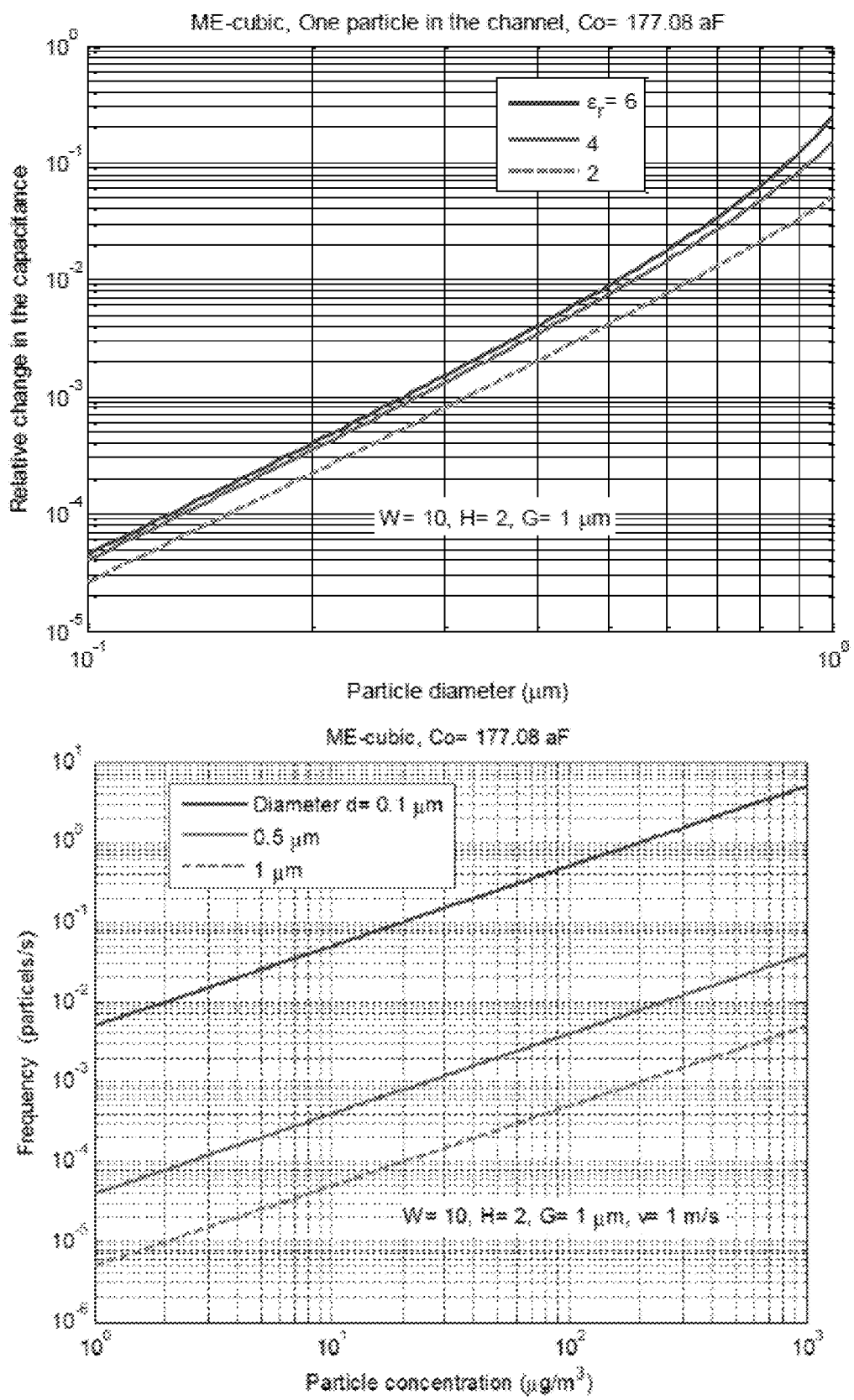
FIG. 2 comprises two plots in accordance with at least some embodiments of the present invention.

FIG. 2 comprises two plots in accordance with at least some embodiments of the present invention. In the upper plot, a relative change in capacitance is plotted against particle diameter. The relative change in diameter is on the vertical axis, and the particle diameter is on the horizontal axis. The gap between the plates has a width, G, of 1 micrometre. A height, H, of the plates is 2 micrometres and a width, W, of the plates is ten micrometres. Both axes are logarithmic. For example, a particle of diameter of 0.2 micrometres causes a relative change in capacitance of 1 . . . $4 \times 10^{-4}$ while a particle of diameter 0.9 micrometres causes a relative change in capacitance of $3 \times 10^{-2}$ . . . $1 \times 10^{-1}$.

In the lower plot, a frequency of particles is plotted against particle concentration. On the vertical axis, the frequency is presented in a logarithmic scale, and the particle concentration is, likewise in a logarithmic scale, presented on the horizontal axis, in micrograms per square meter. The topmost curve represents particles of diameter 0.1 micrometres, the middle curve represents particles of diameter 0.5 micrometres and the lowest curve represents particles of diameter 1 micrometre. The dimensions of the plates and the gap are the same as in the upper plot, and a velocity of gas is one metre per second. As the plot indicates, mostly less than one particle per second is expected, with only the smallest particles at highest concentrations presenting about five particles per second. Taking into account the size of the MEMS capacitor and speed of gas 1 m/s, even in these conditions it is expected to be rare that two particles would be present in the gap at the same time.

Figure 3:
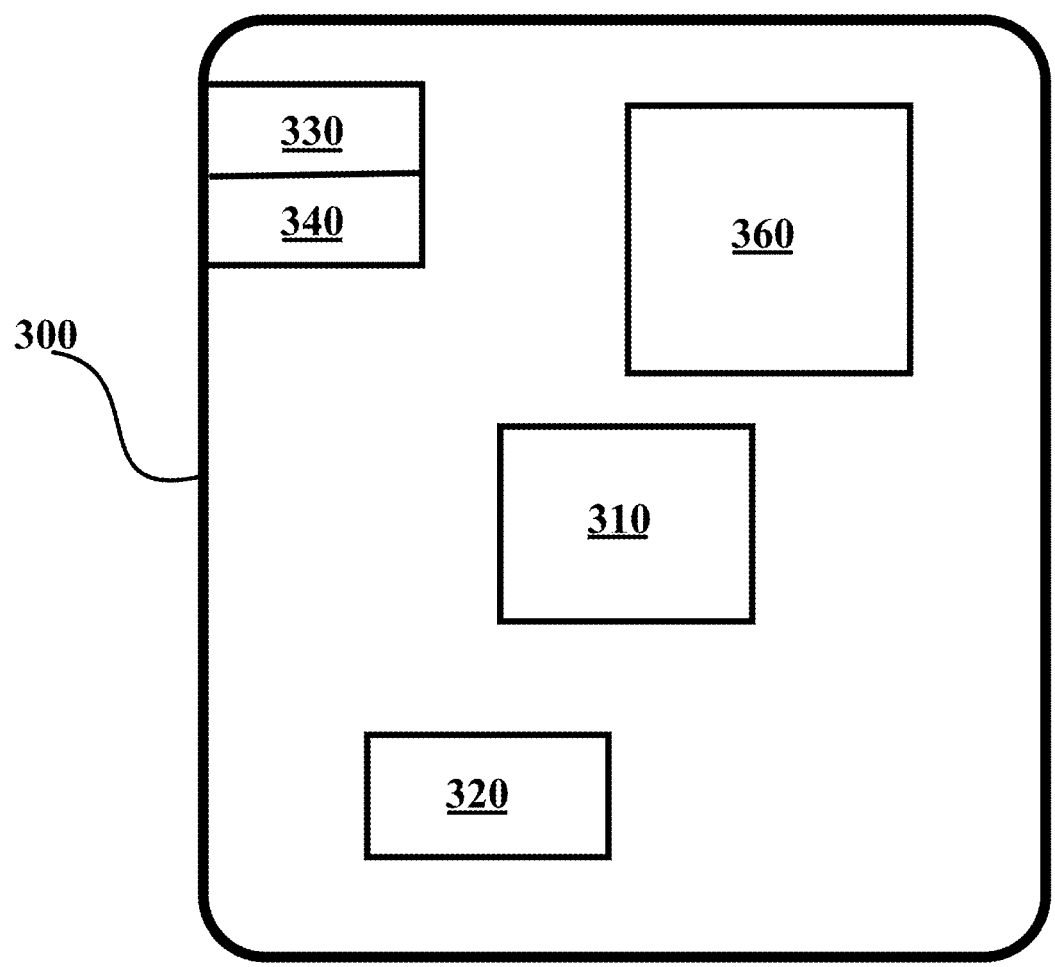
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a control device 160 of FIG. 1. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure particle detection measurements.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above.

Processor 310, memory 320, transmitter 330, receiver 340 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
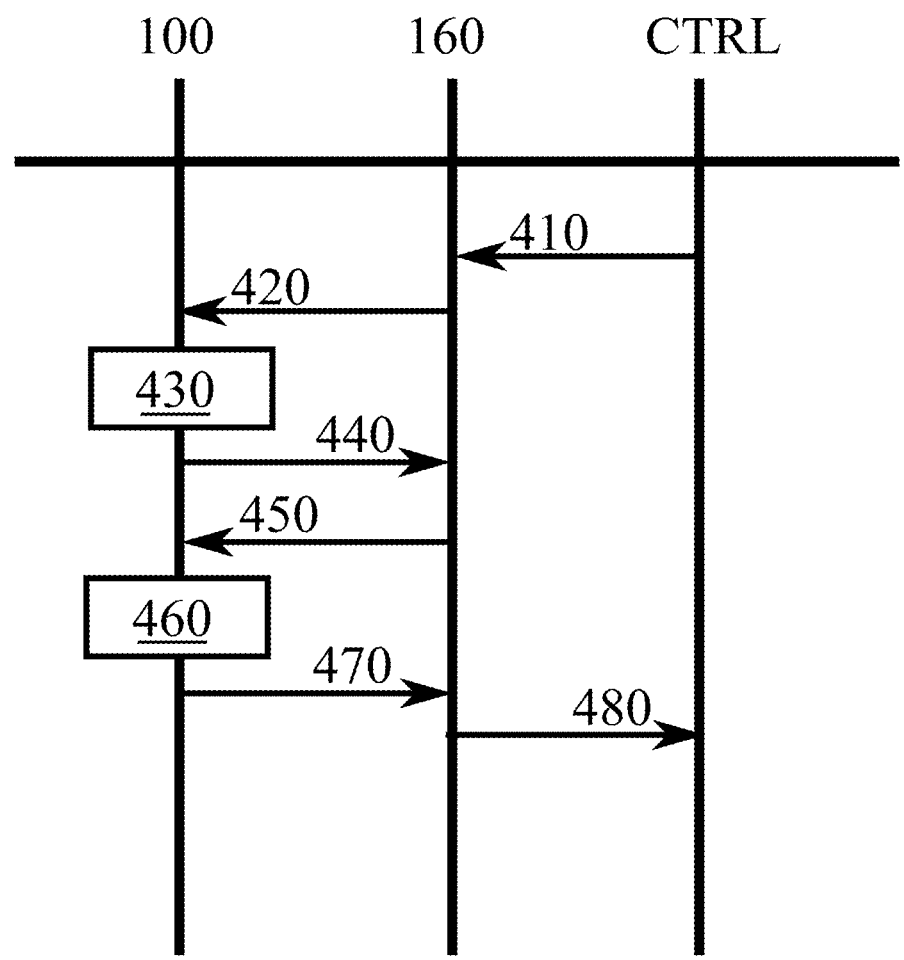
FIG. 4 illustrates signalling in accordance with at least some embodiments of the present invention.

FIG. 4 illustrates signalling in accordance with at least some embodiments of the present invention. On the vertical axes are disposed, on the left, MEMS capacitor 100 of FIG. 1, in the centre, control device 160 of FIG. 1 and on the right, a separate controlling entity CTRL, which may correspond to a meteorological institute or civil defence control centre, for example. Time advances from the top toward the bottom.

In phase 410, the controlling entity CTRL requests a measurement from control device 160. Phase 410 may comprise instructing control device 160 concerning a kind of measurement series that is requested. In response, control device 160 instructs MEMS capacitor 100 to perform a measurement with a first gap width between plates 110, 120. The gap width may be identified in phase 420, or phase 420 may comprise control device 160 controlling MEMS capacitor 100 to assume the desired gap width between the capacitor plates. Phase 430 comprises MEMS capacitor 100 performing the measurement requested in phase 420. Once MEMS capacitor 100 has the measurement result with the first gap width, it returns the result to control device 160 in phase 440. Subsequently, in phase 450, control device 160 instructs MEMS capacitor 100 to perform a measurement with a second gap width between plates 110, 120. Phase 460 comprises MEMS capacitor 100 performing the measurement requested in phase 450. Once MEMS capacitor 100 has the measurement result with the second gap width, it returns the result to control device 160 in phase 470. More than two measurements may be requested and performed, although two are illustrated in FIG. 4. Once control device 160 has the results of the measurement series, it informs the controlling entity CTRL of them, phase 480.

Figure 5:
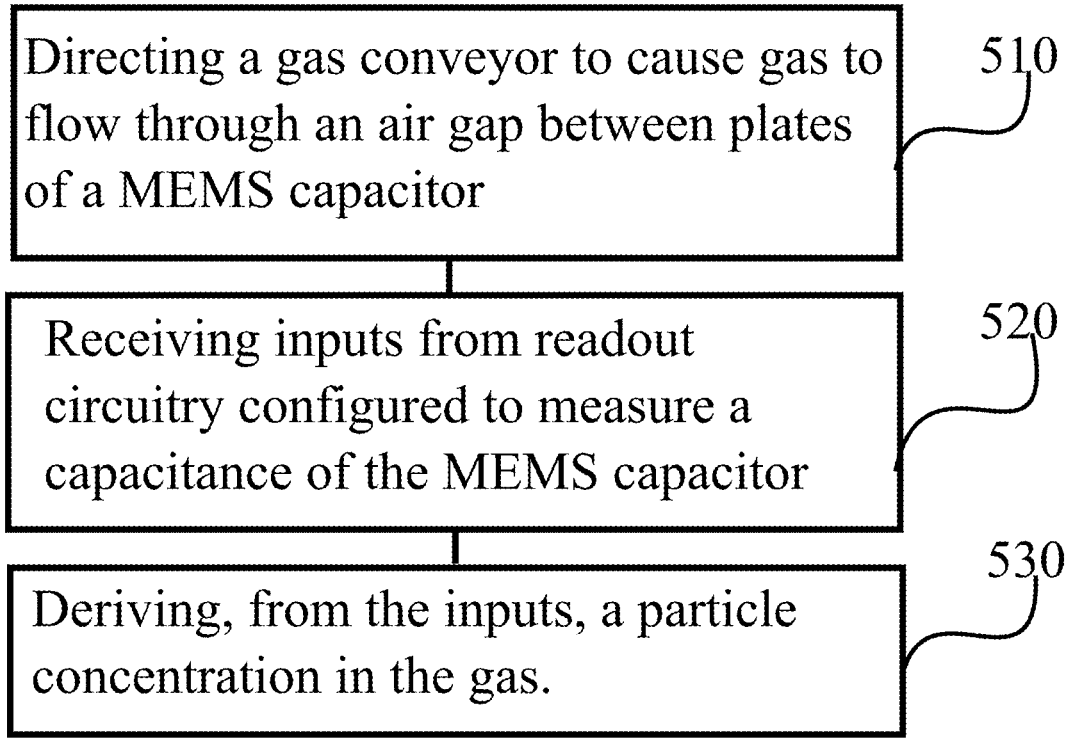
FIG. 5 is a flow graph of a method in accordance with at least some embodiments of the present invention.

FIG. 5 is a flow graph of a method in accordance with at least some embodiments of the present invention. The phases of the illustrated method may be performed in device 110, an auxiliary device or a personal computer, for example, or in a control device configured to control the functioning thereof, when installed therein.

Phase 510 comprises directing a gas conveyor to cause gas to flow through a gap between plates of a microelectromechanical, MEMS capacitor. Phase 520 comprises receiving inputs from readout circuitry configured to measure a capacitance of the MEMS capacitor. Finally, phase 530 comprises deriving, from the inputs, a particle concentration in the gas.

Figure 6:
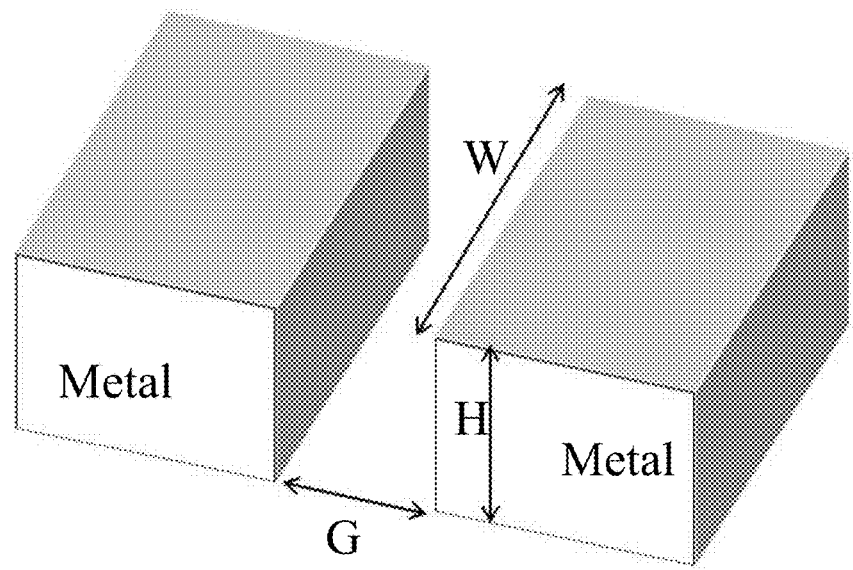
FIG. 6 illustrates concepts in accordance with at least some embodiments of the present invention.
Figure 6:
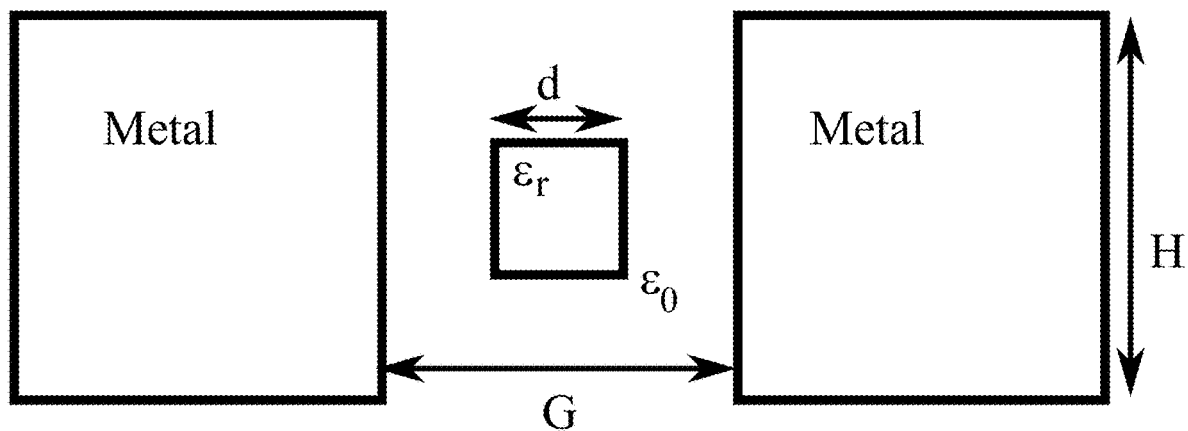

Concerning capacitance of an air gap:

The detector in FIG. 6 consists of two electrodes and air, or another gas, is blown through the gap between them. A perspective representation of the detector, without a particle in the gap, is presented in the upper part of the figure and a diagram of the detector, with a particle of diameter d in the gap, is presented in the lower part of the figure. A particle in the gap changes the capacitance. This is calculated for a cubic particle in the device of FIG. 6. If the particle permittivity $E_r$ is close to 1 and the gap G is narrow the model particularly accurate.

$$C_{tot} \approx \varepsilon_0 \frac{WH - d^2}{G} + \frac{1}{\frac{1}{C_p} + \frac{1}{C_{gaps}}} = \varepsilon_0 \frac{WH - d^2}{G} + \frac{\varepsilon_0 \varepsilon_r d^2}{d + (G - d)\varepsilon_r}$$

This is plotted in the upper part of FIG. 2. The magnitude of the capacitance change is roughly proportional to $\Delta C \sim d^3$ . . . 4 and thus gives an indication of the particle size. If relative resolution of the capacitance change is $\Delta C/C_0 = 100$ ppm the smallest detectable particle size is $d \approx 0.1$ μm.

A feature of the air gap detector is the slow operation. An average frequency of transport of particle through the channel is $$f \approx N \frac{dV}{dt} = \frac{m}{\rho d^3} vWG,$$

where gas flow velocity is v, mass density of particles ρ, volume flow of air $dV/dt=vWG$, particle mass concentration m, particle mass $M=\rho d^3$, and particle number density $N=m/M$. This is plotted in the lower part of FIG. 2. There, the following conditions may apply: $\rho=2000$ kg/m$^3$, $dV/dt=10^{-11}$ m$^3$/s.

One way to increase the frequency of signal pulses is to increase the pressure difference across the detector. This increases the gas velocity but also shortens the signal pulse. In the conditions the lower part of FIG. 2, the pulse duration may be $\tau=H/v=2$ μs, which benefits from high speed capability for the measurement electronics.

Because the pulse caused by the particle is relatively short, a wide bandwidth may be used. With reasonable values U=10 V, T=300 K, B=1 MHz centered at driving frequency 10 MHz, C=0.09 fF, Q=1000 we get noise limited ΔC=0.00048 aF or ΔC/C=5.5 ppm.

If several gaps are connected in parallel, the total capacitance increases and this lowers the relative capacitance resolution. Every gap may be furnished with its own readout electronics to maintain the relative resolution. This may be accomplished using, for example, integrated read-out electronics.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in particle detection.

ACRONYMS LIST

MEMS microelectromechanical

REFERENCE SIGNS LIST

100 MEMS capacitor
110, 120 plates of MEMS capacitor 100
130 housing
140 spring mounting
150 readout circuitry
160 control device
156, 161 connections
170 gas conveyor
102 gas
300-360 structure of the device of FIG. 3
410-480 phases of the method of FIG. 4

The invention claimed is:

1. An apparatus comprising:
a microelectromechanical (MEMS) capacitor comprising two plates and a gap between the plates, wherein a width of the gap between the two plates is adjustable;
a gas conveyor configured to cause gas to flow through the gap, and
readout circuitry configured to measure a capacitance of the MEMS capacitor, wherein the readout circuitry is configured to detect a transient change in the capacitance of the MEMS capacitor caused by a particle flowing through the gap with the gas.

2. The apparatus according to claim 1, wherein the gas conveyor comprises at least one of a mechanism to create a pressure difference over the gap and a thermophoretic device configured to create a temperature gradient over the gap.

3. The apparatus according to claim 1, wherein the width of the gap is adjustable by applying a voltage over the plates, such that an electrostatic force is caused to move at least one of the plates.

4. The apparatus according to claim 1, wherein the gap has a width of between 0.05 and 2.00 micrometres.

5. The apparatus according to claim 1, wherein the MEMS capacitor further comprises a housing encompassing the two plates and a spring disposed between one of the two plates and an inner wall of the housing such that at least one of the two plates is adjustable relative to the housing to adjust the width of the gap.

6. An apparatus comprising at least one processing core, at least one memory including computer program code, the at least one memory and the computer program code being configured to, with the at least one processing core, cause the apparatus at least to:
   direct a gas conveyor configured to cause gas to flow through a gap between plates of a microelectromechanical (MEMS) capacitor to convey the gas through the gap, wherein the apparatus is configured to cause a width of the gap between the plates to be adjusted;
   receive inputs from readout circuitry configured to measure a capacitance of the MEMS capacitor, wherein a transient change in the capacitance of the MEMS capacitor is caused by a particle flowing through the gap with the gas, and to
   derive, from the inputs, a particle concentration in the gas.

7. The apparatus according to claim 6, wherein the gas conveyor comprises at least one of a mechanism to create a pressure difference over the gap and a thermophoretic device configured to create a temperature gradient over the gap.

8. The apparatus according to claim 6, wherein the apparatus is configured to cause the width of the gap to be adjusted by causing an adjustable voltage to be applied to the plates.

9. The apparatus according to claim 6, wherein the apparatus is configured to obtain, using plural gap widths in sequence, a distribution of particle sizes of particles in the gas.

10. A method comprising:
    directing a gas conveyor to cause gas to flow through a gap between plates of a microelectromechanical (MEMS) capacitor;
    receiving inputs from readout circuitry configured to measure a capacitance of the MEMS capacitor, wherein a transient change in the capacitance of the MEMS capacitor is caused by a particle flowing through the gap with the gas, and
    deriving, from the inputs, a particle concentration in the gas, and causing a width of the gap to be adjusted.

11. The method according to claim 10, wherein the gas conveyor comprises at least one of a mechanism to create a pressure difference over the gap and a thermophoretic device configured to create a temperature gradient over the gap.

12. The method according to claim 10, wherein causing the width of the gap to be adjusted comprises causing an adjustable voltage to be applied to the plates.

13. The method according to claim 10, further comprising obtaining, using plural gap widths in sequence, a distribution of particle sizes of particles in the gas.

14. A non-transitory computer readable medium having stored thereon a set of computer readable instructions that, when executed by at least one processor, cause an apparatus to at least:
    direct a gas conveyor configured to cause gas to flow through a gap between plates of a microelectromechanical (MEMS) capacitor to convey the gas through the gap;
    receive inputs from readout circuitry configured to measure a capacitance of the MEMS capacitor, wherein a transient change in the capacitance of the MEMS capacitor is caused by a particle flowing through the gap with the gas, and
    derive, from the inputs, a particle concentration in the gas and cause a width of the gap between the plates to be adjusted.

* * * * *